Jan. 3, 1928.
H. R. GRAHAM
FRONT SEAT CONSTRUCTION FOR AUTOMOBILES
Filed Aug. 28, 1926
1,654,726
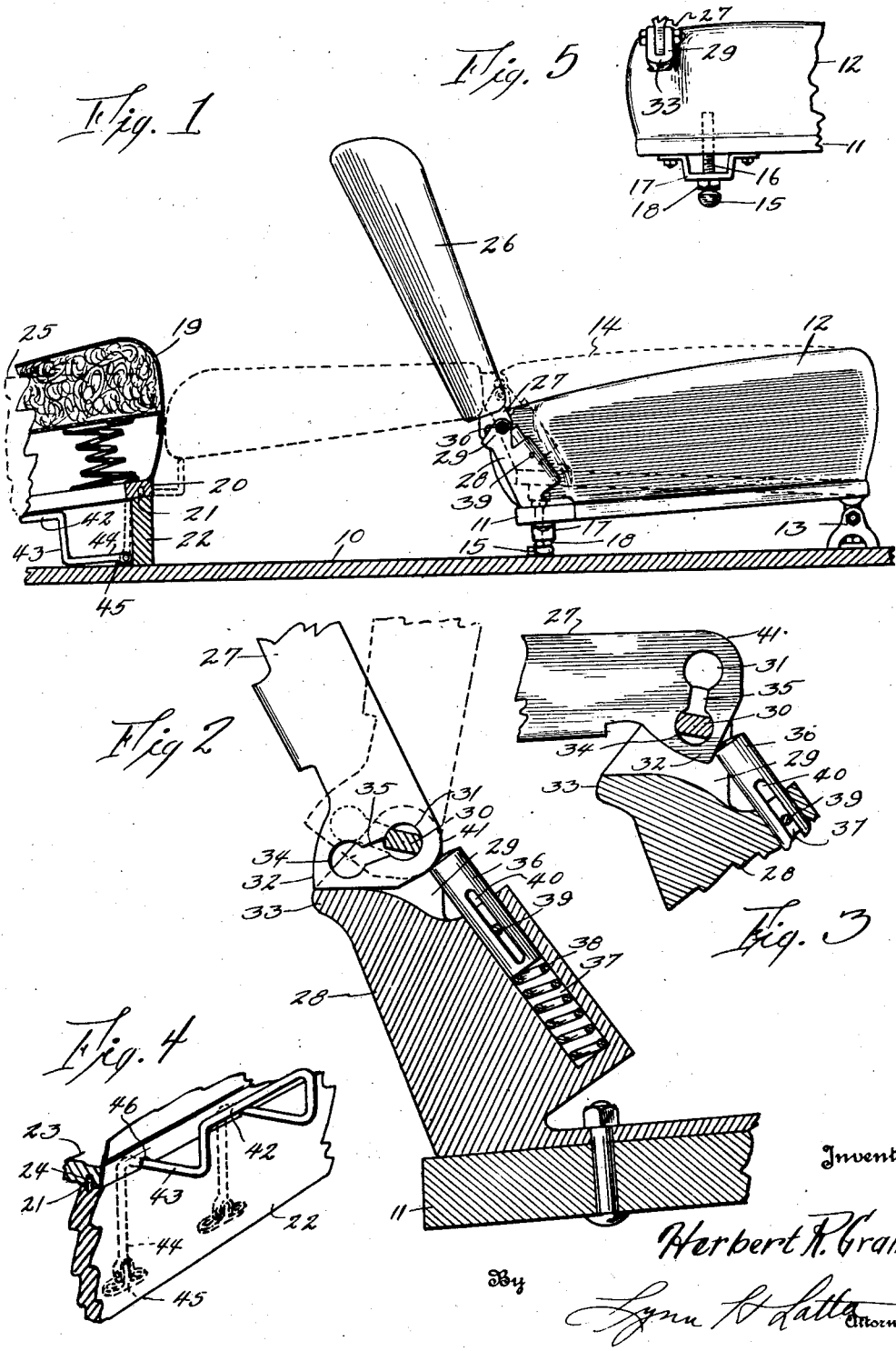

Patented Jan. 3, 1928.

1,654,726

UNITED STATES PATENT OFFICE.

HERBERT R. GRAHAM, OF MILLER, SOUTH DAKOTA.

FRONT-SEAT CONSTRUCTION FOR AUTOMOBILES.

Application filed August 28, 1926. Serial No. 132,301.

My invention relates to a front seat construction for automobiles of the type in which a pair of front seats, hinged for folding movement against the dash of the car, are provided and it is my object to provide a front seat which, together with the rear seat, is convertible into a bed for sleeping. More particularly it is my object to provide a seat construction in which the back of the front seat is adapted to be hinged rearwardly to a horizontal position to bridge the gap between the front seat and rear seat.

Another object is to provide a hinge construction for the front seat back, allowing said back to assume a first position folded against the front seat cushion, a second position projecting upwardly to serve as a back rest and a third position projecting rearwardly and horizontally to serve as a bed, said hinge construction including means for locking the back, when in its normal upright position, against collapsing rearwardly, said hinge allowing such rearward collapsing when the back has been moved forwardly to a certain pre-determined position.

A still further object is to provide such a hinge construction which is spring urged toward locking engagement to maintain the back in its normal upright position.

With these and other objects in view, my invention consists in the arrangement and combination of the various parts of my device, whereby the objects contemplated are attained, as hereinafter more fully set forth, pointed out in my claims, and illustrated in the accompanying drawings, in which:

Fig. 1 is a longitudinal sectional view through the floor of a vehicle embodying my invention.

Fig. 2 is an enlarged detail sectional view through the hinge, the upper portion thereof being shown in dotted lines in the position it assumes preparatory to collapsing the back of the front seat rearwardly.

Fig. 3 is a similar sectional view illustrating the parts in the position which is assumed when the back is in its rearwardly projecting horizontal position.

Fig. 4 is a detail perspective sectional view illustrating the back rest in operative position.

Fig. 5 is a detail elevation of a portion of the rear of the front seat illustrating the means for adjusting the height thereof.

One of the most satisfactory methods of providing a bed in an automobile is that of utilizing the back of the front seat to bridge the gap between the front and rear seats. The advantages of thus forming a bed are several. The cushioned parts of the front and back seats, including the front seat back, are all utilized and it is unnecessary to provide any auxiliary bed spring or mattress. The only additional equipment which need be carried to form the bed is the bed covering and pillows.

Certain problems are met in thus forming a bed. The front and rear seat cushions, in their normal positions, are inclined downwardly and rearwardly. A bed formed with the cushions in such position would be uncomfortable for the sleeper. The back of the front seat must be provided with a hinge which will allow it to swing rearwardly as well as forwardly. At the same time it must be possible to lock the back so that while riding over rough roads it will not collapse to its rearward position. My invention solves these problems in a very simple manner which will add very little to the cost of manufacture of a vehicle.

In Fig. 1 I have used the reference character 10 to indicate generally the floor of a vehicle of the type in which two separate front seats are employed. The front seat comprises a wooden frame 11 to which is secured the cushion 12. The frame 11 is pivoted by means of hinges 13 to the floor of the vehicle. In order to raise the front seat cushion to the horizontal position shown in dotted lines in Fig. 4 I provide the rear legs 15 having the threaded shanks 16 threaded through brackets 17 secured to the seat frame 11. The shanks 16 extend through openings which are not shown in the frame 11. Locknuts 18 serve to prevent undesired rotation of the legs.

When it is desired to raise the front seat the locknuts are loosened slightly, the legs 15 are rotated to extend them and the locknuts are again tightened.

The rear seat cushion 19 is shown in section in Fig. 1. It has a frame 20 provided with openings to receive pegs 21 secured in the seat bed 22.

It will be understood that ordinarily the rear cushion is supported with its frame in an inclined position and is further inclined in its upper surface by virtue of being wedge-shaped, being thicker at its forward extremity than in the rear. I therefore provide the rear cross member 23 (Fig. 4) of the frame 20, with openings 24 to receive the pegs 21 when the cushion has been reversed, front to rear, and by so reversing the cushion, the thicker portion at the rear, its upper surface will assume a substantially horizontal position as indicated in dotted lines at 25 in Fig. 1.

The back 26 of the front seat has the usual metallic frame including side arms 27 terminating in hinge portions. Instead of the usual simple hinge I provide a hinge bracket 28 having at its upper end the spaced ears 29 to receive the ends of the arms 27. A stud 30 extends between the ears 29 and is normally received in a round opening 31 in the arm 27. The opening 31 is formed near the forward edge of the arm and a heel portion 32 extends a substantial distance rearwardly of the opening to engage a shoulder 33 formed between the ears 29 in the bracket 28. The engagement of the heel 32 with the shoulder 33 limits the movement of the back 26 to the positions shown in Figs. 1 and 2.

In order to allow movement of the back rearwardly of this position I provide an auxiliary opening 34 of the same diameter as opening 31 and connected thereto by a slot 35. The stud 30 is flattened as shown in Fig. 2 and is rigidly secured in the ears 29 at the angle shown. The slot 35, when the frame 27 is in its normal position shown in Fig. 2 extends rearwardly and downwardly at an angle to the faces of the stud 30. Consequently when the frame is in this position the stud 30 will be locked within the opening 31 and the heel 32 will be maintained in a position to engage the shoulder 33 so as to lock the back 26 against collapsing rearwardly. I provide a pin 36, slidably mounted in a tubular chamber 37 formed in the bracket 26 and urged upwardly into engagement with the end of the arm 27 by means of a coil spring 38.

The pin 36 is retained against removal from the chamber 37 by a pin 39 received in a slot 40 in the pin 36 and secured in the side walls of the chamber 37.

The lower end of the arm 27, where the pin 36 engages it, is curved as at 41 on an arc concentric with the opening 31. The engagement of the pin 36 normally maintains the stud 30 within the opening 31 during the forward hinging of the back 26 when the front seat is folded forwardly against the dash of the vehicle. Thus when the back is moved from its forward folded position to its normal upright position it will be seen that the heel 32 will be in position to engage the shoulder 33 and to limit the movement of the back rearwardly.

When it is desired to move the back to its rearwardly reclining position the frame is moved to the position shown in dotted lines in Fig. 2 to bring the slot 35 parallel with the faces of the stud 30 and, grasping the frame firmly with both hands, one at the lower end of either arm 27, the operator pushes forwardly against the action of the spring urged pin 36, causing the stud 30 to traverse the slot 35 and enter the opening 34. Still pressing against the action of the pin 36 the operator swings the back rearwardly until the stud 30 has become locked within the opening 34 and then allows it to drop to the position shown in Fig. 1 in dotted lines. It will be noted that when the stud 30 is engaged within the opening 34 that the heel 32 will swing clear of the shoulder 33. It will also be seen that when the back 26 is again lifted to its upright position and moved forwardly to bring the slot 35 in alignment with the faces of the stud 30, that the pressure of the pin 36 will cause the arms 27 to automatically snap rearwardly to their normal positions relative to the stud 30.

Before lowering the back to its horizontal position, the bracket shown in Fig. 4 normally contained beneath the rear seat, as shown in Fig. 1, is moved to the dotted line position shown in Fig. 1. The bracket comprises a U shaped portion 42, the arms of which are bent rearwardly, as at 43, and thence downwardly as at 44 (referring to the upright operative position shown in Fig. 4). The lower ends of the arms 44 are bifurcated and pivoted to brackets 45 secured to the floor 10, just rearwardly of the bed member 22. The U shaped portion 42 serves to receive the back 26 as shown in Fig. 1.

The members 23 of the rear seat frame 20 are provided with notches 46 to receive the arms 43 of the hinged bracket. This allows the seat to engage the bed snugly.

The advantages of my invention have been suggested and it may be added that in order to move the back to its several positions, it is only necessary to grasp it and exert pressure thereagainst in the proper direction.

There is no necessity for unloosening any bolts or removing any parts. In practical use of the bed, it may be found desirable to simply block up the rear legs 15 by a short length of joist or the like rather than extending them by unthreading them from their brackets.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a front seat frame for vehicles, a pair of brackets secured to the frame, pivot studs supported by said brackets, said brackets having shoulders located at one side of the respective studs, a back frame having arms each provided at its end with a pair of spaced circular openings, each pair of openings being connected by a slot, a stud being received in an opening of each pair and being flattened to pass through the slot to the other opening when the back is in a position forward of its normal upright position, each arm having a heel adapted to engage its bracket shoulder when the stud is in one of the openings of a pair of openings in order to lock the back against movement rearwardly of its normal upright position and to swing clear of the shoulder when the stud is in the other opening of the respective pair.

2. In a front seat frame for vehicles, a pair of brackets secured to the frame, pivot studs supported by said brackets, said brackets having shoulders located at one side of the respective studs, a back frame having arms each provided at its end with a pair of spaced circular openings, each pair of openings being connected by a slot, a stud being received in an opening of each pair and being flattened to pass through the slot to the other opening when the back is in a position forward of its normal upright position, each arm having a heel adapted to engage its bracket shoulder when the stud is in one of the openings of a pair of openings in order to lock the back against movement rearwardly of its normal upright position, and to swing clear of the shoulder when the stud is in the other opening of the respective pair, and resilient means adapted to urge the arms and brackets toward relative positions in which the back will be locked against rearward movement.

3. In a front seat construction for vehicles, a front seat frame, a pair of brackets secured to the frame, said brackets having hinge elements, studs carried by said hinge elements, the brackets having shoulders located at one side of the studs, and having tubular chambers, a back frame having arms provided each at its end with a pair of spaced circular openings, each pair of openings being connected by a slot, a stud being received in one opening of a pair and being flattened so as to pass through the slot to the other opening of the respective pair when the back is in a position forward of its normal upright position, and a spring urged pin slidably mounted in each of said chambers and engaging the lower end of an arm to urge it toward position wherein the stud is received in one opening of a pair, each arm having a heel adapted to engage its bracket shoulder when the stud is in one of the openings of a pair of openings in order to lock the back against movement rearwardly of its normal upright position and to swing clear of the shoulder when the stud is in the other opening of the respective pair.

4. In a front seat construction for automobiles, a front seat frame, a pair of brackets secured to the frame, to form a pair of hinge elements, a seat back frame having arms forming a pair of coacting hinge elements, one of said pair of hinge elements having shoulders, studs carried by said last mentioned pair of hinge elements, the shoulders being located at one side of the studs, the hinge elements of the other pair each having a pair of spaced circular openings connected by a slot, and having a heel, a stud being received in one opening of a pair of openings and being flattened to pass through the slot to the other opening when the back is in a position forward of its normal upright position, each heel being adapted to engage its corresponding shoulder when the stud is in one of the openings of a pair of openings in order to lock the back against movement rearwardly of its normal upright position and to swing clear of the shoulder when the stud is in the other opening of the respective pair.

5. In a front seat construction for automobiles, a front seat frame, a pair of brackets secured to the frame, to form a pair of hinge elements, a seat back frame having arms forming a pair of coacting hinge elements, one of said pair of hinge elements having shoulders, studs carried by said last mentioned pair of hinge elements, the shoulders being located at one side of the studs, the hinge elements of the other pair each having a pair of spaced circular openings connected by a slot, and having a heel, a stud being received in one opening of a pair of openings, and being flattened to pass through the slot to the other opening when the back is in a position forward of its normal upright position, each heel being adapted to engage its corresponding shoulder when the stud is in one of the openings of a pair of openings in order to lock the back against movement rearwardly of its normal upright position and to swing clear of the shoulder when the stud is in the other opening of the respective pair, and resilient means adapted to urge the arms and brackets toward relative positions in which the back will be locked against rearward movement.

Signed this 21st day of August, 1926, at Sioux City, in the county of Woodbury and State of Iowa.

HERBERT R. GRAHAM.